(12) United States Patent
Boileau

(10) Patent No.: US 10,458,362 B2
(45) Date of Patent: Oct. 29, 2019

(54) TURBOJET NACELLE PROVIDED WITH A THRUST REVERSER, INCLUDING CUT-OUTS TO AVOID THE MOVABLE SLAT OF AN AIRCRAFT WING

(71) Applicant: SAFRAN NACELLES, Gonfreville l'Orcher (FR)

(72) Inventor: Patrick Boileau, Tournefeuille (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 280 days.

(21) Appl. No.: 15/377,257

(22) Filed: Dec. 13, 2016

(65) Prior Publication Data
US 2017/0089297 A1 Mar. 30, 2017

Related U.S. Application Data

(63) Continuation of application No. PCT/FR2015/051818, filed on Jul. 1, 2015.

(30) Foreign Application Priority Data

Jul. 1, 2014 (FR) ...................... 14 56281

(51) Int. Cl.
*F02K 1/72* (2006.01)
*F02K 1/62* (2006.01)
*F01D 25/24* (2006.01)

(52) U.S. Cl.
CPC .............. *F02K 1/625* (2013.01); *F01D 25/24* (2013.01); *F02K 1/72* (2013.01); *F05D 2220/323* (2013.01); *Y02T 50/671* (2013.01)

(58) Field of Classification Search
CPC ... F02K 1/625; F02K 1/72; F02K 1/78; F02K 1/80; B64D 29/02
See application file for complete search history.

(56) References Cited

U.S. PATENT DOCUMENTS 8,402,765 B2 * 3/2013 Amkraut ................... F02K 1/09
60/771
8,727,275 B2 * 5/2014 Aten ......................... F02K 1/72
244/110 B (Continued)

FOREIGN PATENT DOCUMENTS

EP 2620627 7/2013
FR 2758161 7/1998
(Continued)

OTHER PUBLICATIONS

International Search Report for International Application PCT/FR2015/051818, dated Oct. 28, 2015.

*Primary Examiner* — Andrew H Nguyen
(74) *Attorney, Agent, or Firm* — Burris Law, PLLC

(57) ABSTRACT

The disclosure relates to a turbofan nacelle including a thrust reverser, the thrust reverser including a movable cover moving back from a closed position in which the thrust is not reversed to an open position for uncovering cascades that reverse the direction of the flow of cold air which is diverted from the annular stream of secondary air, the movable cover including a radially outer portion intended for being adjacent to a leading edge of a wing of an aircraft. The movable cover includes on the radially outer portion at least one cut-out intended for avoiding interference with a movable slat of the leading edge of the wing of the aircraft, as well as a panel for closing the cut-out, the closing panel including a stationary portion at least partially covered by an upstream portion of the movable cover when the movable cover is in the open position.

10 Claims, 2 Drawing Sheets

(56) References Cited

U.S. PATENT DOCUMENTS

| | | | | |
|---|---|---|---|---|
| 2013/0280052 A1* | 10/2013 | Gonidec | ............... | B64D 29/06 |
| | | | | 415/182.1 |
| 2014/0246514 A1* | 9/2014 | Gukeisen | ................. | F02K 1/58 |
| | | | | 239/265.19 |
| 2016/0245227 A1* | 8/2016 | Crawford | .............. | B64D 33/04 |

FOREIGN PATENT DOCUMENTS

| | | |
|---|---|---|
| FR | 2933143 | 1/2010 |
| FR | 2968635 | 6/2012 |
| WO | 2014/052061 | 4/2014 |

\* cited by examiner

TURBOJET NACELLE PROVIDED WITH A THRUST REVERSER, INCLUDING CUT-OUTS TO AVOID THE MOVABLE SLAT OF AN AIRCRAFT WING

CROSS-REFERENCE TO RELATED APPLICATIONS

This application is a continuation of International Application No. PCT/FR2015/051818, filed on Jul. 1, 2015, which claims the benefit of FR 14/56281 filed on Jul. 1, 2014. The disclosures of the above applications are incorporated herein by reference.

FIELD

The present disclosure concerns a thrust reverser for an aircraft nacelle receiving a turbojet engine, as well as an aircraft nacelle equipped with such a thrust reverser.

BACKGROUND

The statements in this section merely provide background information related to the present disclosure and may not constitute prior art.

The motorization assemblies with a turbojet engine for aircraft include a nacelle forming a generally circular outer envelope, comprising thereinside a turbojet engine disposed along the longitudinal axis of this nacelle.

The turbojet engine receives fresh air coming from the upstream or front side, and discharges, on the downstream or rear side, hot gases resulting from the combustion of fuel, which provide a certain thrust. For bypass turbojet engines, fan blades disposed around the motor generate a significant secondary cold air flow along an an annular flow path passing between this motor and the nacelle, which generates a high thrust.

Some nacelles include a thrust reverser system which closes at least partially the cold air annular flow path, and discharges the secondary flow forwards in order to generate a braking reverse thrust of the aircraft.

A known type of thrust reverser, presented in particular by the document FR-A1-2758161, includes rear movable cowls axially sliding downstream under the effect of cylinders, while deploying flaps in the annular flow path in order to close this flow path at least partially. These flaps return the cold air flow radially outwards while passing through uncovered cascades during the sliding, comprising blades which direct this flow forwards.

Moreover, the wings of some aircrafts include movable leading edge slats which are deployed forwards and downwards in order to modify the aerodynamic characteristics of these wings, in particular when flying at low speed during landing.

In this case, in particular for nacelles with a large diameter disposed close to the wings in order to keep a sufficient ground clearance below, it is possible to obtain an interference between the deployed movable leading edge slat, and the movable cowls when they move backwards in order to implement the thrust reverser.

In order to avoid this interference, a known type of nacelle, presented in particular by the documents FR-A1-2968635 and EP-A2-2620627, includes at each side of the vertical mast (pylon) maintaining the nacelle, in the area close to the leading edge of the wing located on the top of this nacelle, a small fixed cowl which completes the movable cowl so as to close the entire annular surrounding of the nacelle. In this case, as the small fixed cowl does not move backwards during the opening of the cowl, the risk of interference with the movable leading edge slat is eliminated.

Nevertheless, as these two fixed cowls do not open, they reduce the air flow over the angular sector that they cover during the thrust reversal, and therefore the braking thrust delivered by this thrust reverser.

SUMMARY

Thus, the present disclosure takes advantage of the shape of the movable cowl, in general substantially bulging, which passes above the fixed part of the closure panel when moving backwards.

The nacelle according to the present disclosure may further include one or more of the following characteristics, which may be combined therebetween.

According to one form, the cut-out of the movable cowl does not extend up to the upstream end of the movable cowl, and may present a contour fitted around the area of interference between the movable cowl and the movable slat of the leading edge, the cut-out thus allows avoiding a physical contact between the slat and the movable cowl with a reduced impact on the structure of the nacelle, and while preserving the aerodynamic quality of the nacelle thanks to the closure panel which is brought to reestablish a continuity of the outer surface of the nacelle (i.e., a continuous outer moldline (OML)) when the movable cowl is in the closed position.

It is noted that the terms upstream and front, and in the same manner the terms downstream and rear, are used interchangeably.

Therefore, structural simplifications are possible, in particular the possibility to keep the positioning of a secondary rail of the nacelle on a beam of the nacelle, on which are resumed forces induced by the installation of the movable cowl of the thrust reverser in connection with the secondary rail. This device is configured such that it is not necessary to offset the position of the secondary rail relative to the beam of the nacelle.

Besides, since the cut-out is adjusted, the bulk of the closure panel is reduced, thus, in the open position of the movable cowl, the effectively uncovered surface of the cascades of the thrust reverser is increased, making the braking by thrust reversal more effective.

According to another form, the closure panel is integrally fixed in the nacelle. Thus, a simple and economical thrust reverser is achieved.

According to another form, the closure panel comprises a movable part displaced downstream of the nacelle as the movable cowl slides.

In this case, the thrust reverser may include a device for shifting the movable part of the closure panel radially inwardly of the nacelle during the displacement thereof downstream of the nacelle.

Advantageously, the movable part of the closure panel is located upstream of the fixed part of the closure panel when the movable cowl is in the closed position. Thus, it can further increase the effectively uncovered surface of the cascades of the thrust reverser so as to improve the operation thereof when the movable cowl is in the open position.

The closure panel may include a radially outer surface which lies in the extension of the outer surface of the movable cowls. Thus, a marginal drag of the nacelle is obtained when the movable cowl is closed.

In particular, the movable cowl may include at each side of the location intended to receive a beam maintaining the movable cowl, a cut-out receiving a closure panel.

The present disclosure also includes an aircraft including a nacelle comprising any one of the preceding characteristics.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
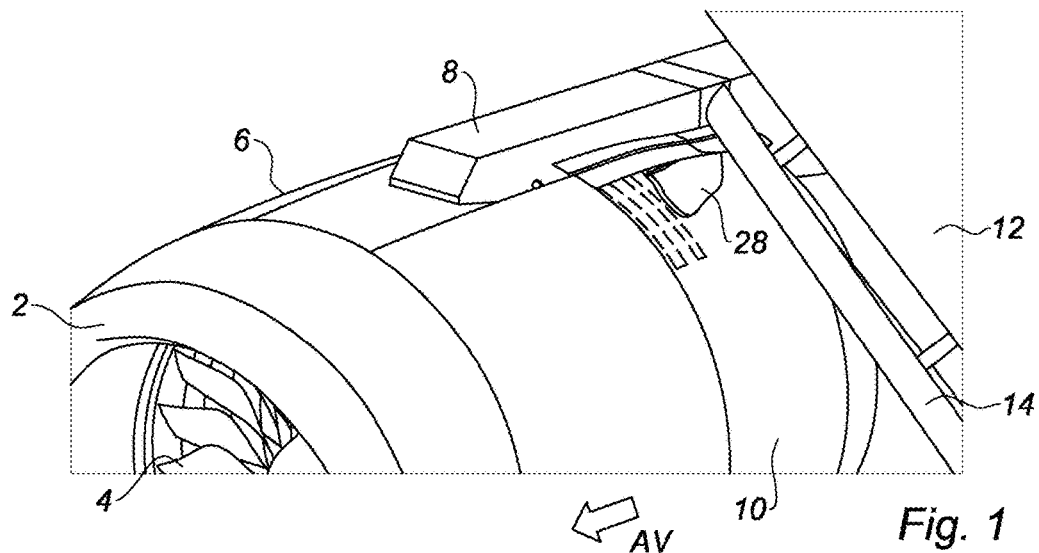
FIG. 1 is an external perspective view of a thrust reverser according to the present disclosure shown in the closed position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
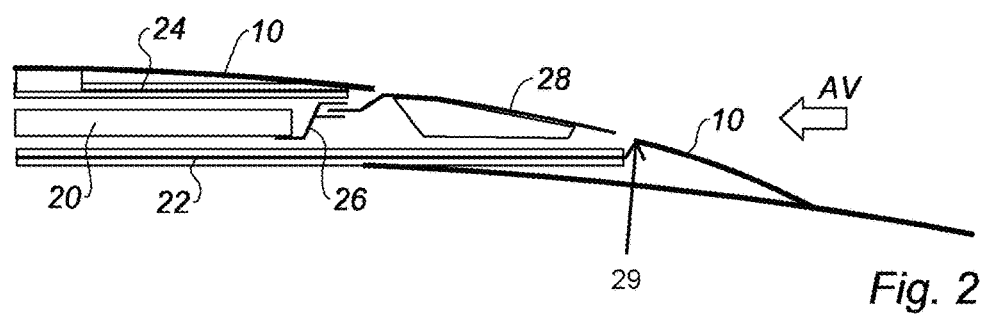
FIG. 2 is an axial sectional view of the thrust reverser of FIG. 1.

FIGS. 1 and 2 show a turbojet engine nacelle hanging from a mast (pylon), through a beam 8, disposed in a vertical plane, including a front air inlet 2 surrounding compressor blades 4, then downstream, fixed cowls 6 surrounding the central part, and two movable cowls 10 each substantially forming a half-circle, which join the beam 8 at its upper part.

The movable cowls 10 are guided by longitudinal rails which radially surround cascades 20 installed around the nacelle, including blades for straightening the fresh air flow upstream. Primary rails 22 are disposed radially inward of the cascades 20, and secondary rails 24 outward.

The cascades 20 are supported downstream by a fixed rear frame 26, which forms a circular load-bearing structure around the nacelle.

Each movable cowl 10 includes in its upper part, next to the beam 8, a cut-out located between the upstream and downstream ends thereof, which receives a closure panel 28 completely closing this opening when the thrust reverser is in the closed position thereof.

As shown, each closure panel 28 held by the rear frame 26 in a fixed position, includes a surface lying in the continuity of the outer surface of the movable cowl 10 thereof, thus maintaining a continuous outer moldline (OML).

Figure 3:
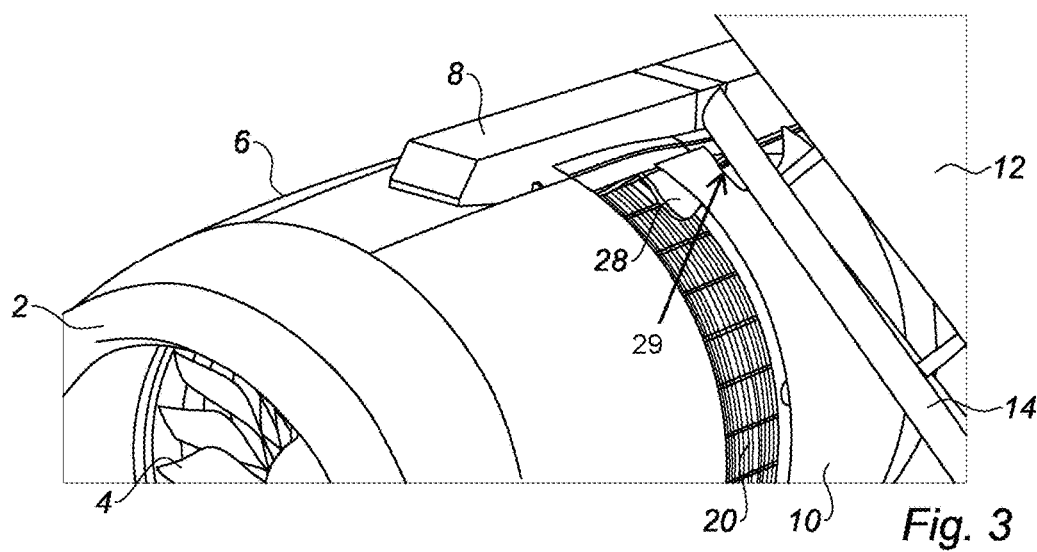
FIG. 3 is an external perspective view of the thrust reverser of FIG. 1 in the deployed position.
Figure 4:
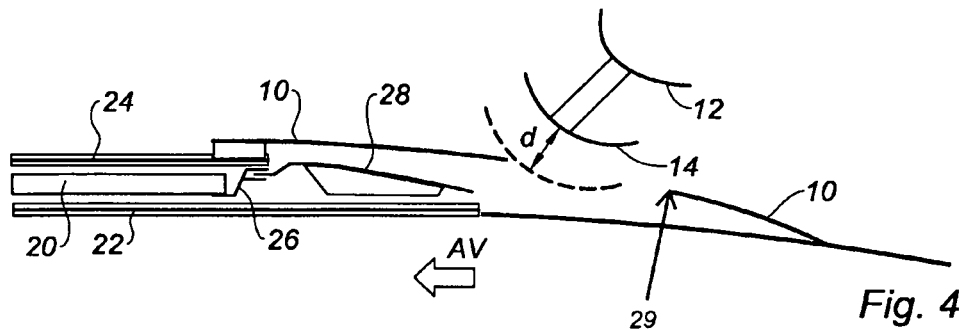
FIG. 4 is an axial sectional view of the thrust reverser of FIG. 3.

FIGS. 3 and 4 show the deployed thrust reverser, including the movable cowls 10 which have moved backwards under the effect of control actuators. The movable slats 14 of the leading edges of the wings 12 are completely deployed so as to come forwards and downwards, in order to improve the lift of the wings at low speeds during landing.

In this case, at each side of the beam 8, the closure panel 28 has remained in the original position thereof while opening the cut-out of the movable cowl 10, the closest part of the movable slat 14 to the nacelle coming in the proximity of this cut-out with a safety distance "d." Thus, a risk of physical contact between these two elements which might cause a wear and a failure is inhibited.

It will be noted that since the cut-out of the movable cowl 14 is limited based on the space required for the proximity of the movable slat 14, a cut-out with a reduced size which allows not limiting the performance of the thrust reverser in this position is obtained.

Moreover, in the normal flight position, as the closure panel 28 lies in the continuity of the surface of the movable cowl 10, there is no aerodynamic loss.

It will be noted that in some configurations, when the movable cowls 10 are deployed, a front part of each closure panel 28 covers the cascades 20, and therefore limits the reverse flow. Therefore, there is a small reduction of the thrust of the reverse flow.

Figure 5:
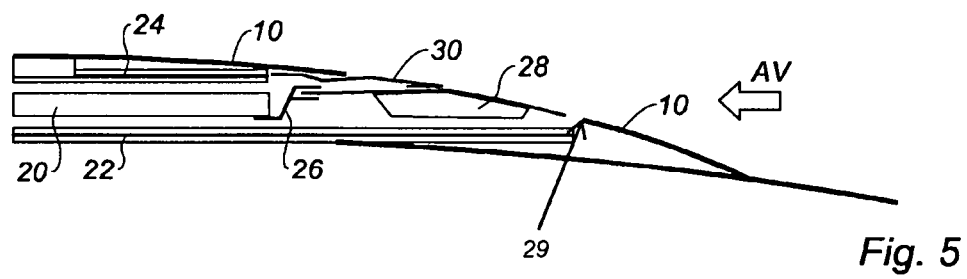
FIG. 5 is a sectional view of the thrust reverser of FIG. 1 in the closed position, including a closure panel according to one variant of the present disclosure.
Figure 6:
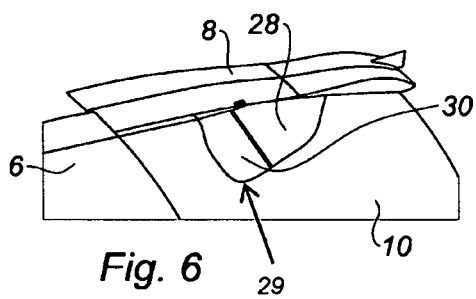
FIG. 6 is a detail view of the thrust reverser of FIG. 5.

FIGS. 5 and 6 show a closure panel 28 made in two parts, a fixed rear part connected to the beam 8 and to the rear frame 26, and a movable front part 30 connected to the movable cowl 10 so as to slide downstream simultaneously with said movable cowl. The movable front part 30 of the closure panel is hinged or deformable, and is shifted inside the kinematically guided nacelle when the movable cowl 10 moves backwards.

Figure 8:
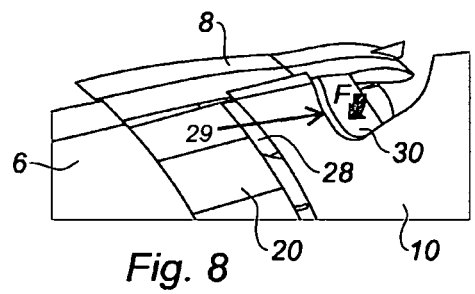
FIG. 8 is and a detail view of the thrust reverser of FIG. 7.
Figure 7:
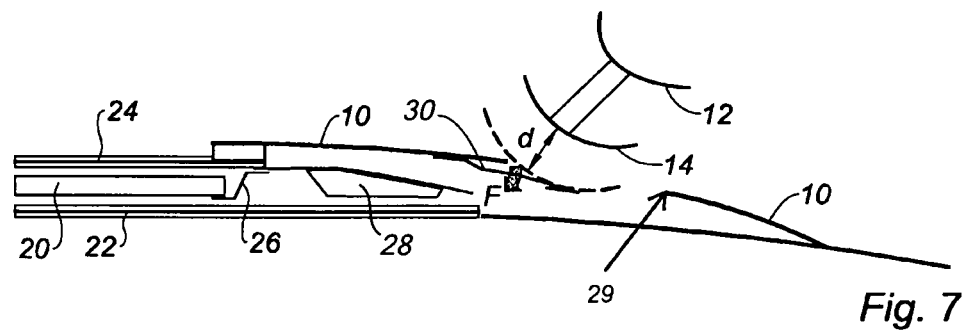
FIG. 7 is an axial sectional view of the thrust reverser of FIG. 5 in the deployed position.

During its downstream sliding movement driven by the movable cowl 10, shown by FIGS. 7 and 8, a mechanical device for controlling the movable front part 30 of the closure panel, such as a cam, deforms this part or makes it pivot as shown by the arrow F so as to come close to the axis of the nacelle. Thus, an outer surface of the movable part 30 moves away from the movable slat 14 of the wing 12 in the deployed position thereof.

Alternatively, it is possible to provide a completely rigid closure panel 28, which slides backwards with the movable cowl 10, and which, during this movement of sliding backwards with the movable cowl 10, is inclined or is shifted completely inwardly of the nacelle.

It will be noted that as the movable front parts 30 of the closure panels slide backwards with the movable cowls 10 during deployment of the movable cowls 10, thus they completely clear the two sectors of the cascades 20 disposed at each side of the beam 8, so as to provide improved reversal flow.

Thus, without modifying the guidance of the movable cowls 10 integrated into the beam 8, the thrust reverser cascades 20 and the frames 26 supporting these cascades, while keeping a conventional architecture of the thrust reversers, and with a small additional mass, an improvement of the operation of the thrust reverser and reduction of the drag of the nacelle in all the positions of this thrust reverser is obtained.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for bypass turbojet engine comprising a thrust reverser, the thrust reverser comprising a movable cowl moving backwards from a closed position where a thrust is not reversed to an open position so as to uncover cascades reversing a direction of a cold air flow which is diverted from a secondary air annular flow path, the movable cowl including a radially outer part disposed in proximity to a leading edge of a wing of an aircraft, wherein the movable cowl includes on the radially outer part at least one cut-out configured to receive, without physical contact, a movable slat of the leading edge of the wing of the aircraft, and a closure panel for closing the at least one cut-out, the closure panel comprising a fixed part which is at least partially covered by an upstream portion of the movable cowl when the movable cowl is in the open position.

2. The nacelle according to claim 1, wherein the at least one cut-out of the movable cowl does not extend up to the upstream portion of the movable cowl.

3. The nacelle according to claim 1, wherein the closure panel is integrally mounted in the nacelle.

4. The nacelle according to claim 1, wherein the closure panel comprises a movable part displaced backwards as the movable cowl slides.

5. The nacelle according to claim 4, wherein the movable part of the closure panel is shifted radially and inwardly when the movable part is displaced backwards.

6. The nacelle according to claim 4, wherein the movable part of the closure panel is located upstream of the fixed part of the closure panel when the movable cowl is in the closed position.

7. The nacelle according to claim 1, wherein the closure panel includes a radially outer surface which lies in an extension of an outer surface of the movable cowl.

8. The nacelle according to claim 1, wherein the movable cowl includes at each side of a location intended to receive a beam maintaining the movable cowl, the at least one cut-out receiving the closure panel.

9. The nacelle according to claim 8 further comprising a secondary rail positioned on the beam.

10. An aircraft including a nacelle according to claim 1.

* * * * *